(12) United States Patent
Zheng

(10) Patent No.: US 12,466,716 B2
(45) Date of Patent: Nov. 11, 2025

(54) AUTOMATIC CUP COVERING SYSTEM FOR INTELLIGENT DRINKING BAR

(71) Applicant: SMYZE Intelligence Technology (Shanghai) Co., Ltd., Shanghai (CN)

(72) Inventor: Fang Zheng, Shanghai (CN)

(73) Assignee: SMYZE Intelligence Technology (Shanghai) Co., Ltd., Shanghai (CN)

(*) Notice: Subject to any disclaimer, the term of this patent is extended or adjusted under 35 U.S.C. 154(b) by 88 days.

(21) Appl. No.: 18/617,532

(22) Filed: Mar. 26, 2024

(65) Prior Publication Data
US 2025/0002316 A1    Jan. 2, 2025

(30) Foreign Application Priority Data
Jun. 29, 2023    (CN) .......................... 202310782584.1

(51) Int. Cl.
   *B67B 6/00*      (2009.01)
   *B65B 11/00*     (2006.01)
   *B65B 11/02*     (2006.01)
   *B65B 41/16*     (2006.01)
   *B65B 57/04*     (2006.01)

(52) U.S. Cl.
   CPC .............. *B67B 6/00* (2013.01); *B65B 11/006* (2013.01); *B65B 11/025* (2013.01); *B65B 41/16* (2013.01); *B65B 57/04* (2013.01)

(58) Field of Classification Search
CPC .......... B67B 6/00; B65B 7/28; B65B 11/006; B65B 11/025; B65B 41/16; B65B 57/04; G07F 13/10
See application file for complete search history.

(56) References Cited

U.S. PATENT DOCUMENTS

| | | | | |
|---|---|---|---|---|
| 1,060,948 A | * | 5/1913 | Schuster .............. | B67B 3/2053 53/299 |
| 1,942,885 A | * | 1/1934 | Tevander .................. | B67B 3/02 271/106 |
| 2,919,830 A | * | 1/1960 | Anderson ............. | B65G 59/10 221/104 |
| 3,279,652 A | * | 10/1966 | Willvonseder ....... | B65G 59/102 221/223 |

(Continued)

FOREIGN PATENT DOCUMENTS

| | | | | |
|---|---|---|---|---|
| CN | 108725892 A | * | 11/2018 | ............. B65B 43/50 |
| CN | 208722313 U | * | 4/2019 | ............. G07F 13/10 |

(Continued)

*Primary Examiner* — Anna K Kinsaul
*Assistant Examiner* — Mobeen Ahmed
(74) *Attorney, Agent, or Firm* — IPro, PLLC

(57) ABSTRACT

An automatic cup covering system for an intelligent drinking bar has a base, a lifting device and a cup covering device. The base has a cup holder opening for receiving a cup. An end of the base away from the cup holder opening has a support. The lifting device is on the support and directly above the cup holder opening. The cup covering device is configured to cover a cup rim of the cup. The lifting device has a lifting connector that is movable, and the cup covering device is connected to the lifting connector. After receiving a drink, the cup is placed into the cup holder opening, and the lifting device causes the cup covering device to hold a cup lid and cover the cup rim with the cup lid from top to bottom.

7 Claims, 5 Drawing Sheets

(56) References Cited

U.S. PATENT DOCUMENTS

| | | | | |
|---|---|---|---|---|
| 3,345,801 A | * | 10/1967 | West | B65B 7/2842 53/313 |
| 3,492,785 A | * | 2/1970 | Mancini | B65B 3/32 221/221 |
| 3,533,211 A | * | 10/1970 | Einnehmer | G07F 13/10 53/471 |
| 3,572,007 A | * | 3/1971 | Shelby | B29C 57/12 53/329.4 |
| 3,712,483 A | * | 1/1973 | Messervey | B65G 57/307 221/222 |
| 3,899,102 A | * | 8/1975 | Lack | G07F 13/10 221/6 |
| 3,905,178 A | * | 9/1975 | West | B65B 43/44 53/328 |
| 3,932,978 A | * | 1/1976 | Kinney | G07F 13/10 221/222 |
| 4,033,627 A | * | 7/1977 | Morroni | B62K 25/02 301/124.1 |
| 4,241,848 A | * | 12/1980 | Young | B65G 59/107 221/222 |
| 4,288,003 A | * | 9/1981 | Fries, Jr. | B65G 59/108 221/222 |
| 4,319,441 A | * | 3/1982 | Credle | B65B 7/2807 53/131.2 |
| 4,426,017 A | * | 1/1984 | Ficken | B65G 59/102 221/241 |
| 4,436,222 A | * | 3/1984 | Taylor | A47F 1/106 221/223 |
| 4,531,342 A | * | 7/1985 | Wittenborg | G07F 13/10 222/2 |
| 4,580,697 A | * | 4/1986 | Maulshagen | B65G 59/066 221/241 |
| 4,594,838 A | * | 6/1986 | Ficken | B65B 7/28 53/325 |
| 4,625,776 A | * | 12/1986 | Mikkelsen | G07F 13/10 141/83 |
| 4,632,274 A | * | 12/1986 | Garbe | G07F 13/10 221/96 |
| 4,989,753 A | * | 2/1991 | Brogna | G07F 13/10 221/121 |
| 5,152,120 A | * | 10/1992 | Huang | B67B 3/22 53/353 |
| 5,261,467 A | * | 11/1993 | Yamamoto | G07F 13/10 141/97 |
| 6,786,359 B1 | * | 9/2004 | Schroeder | G07F 13/10 221/277 |
| 9,994,340 B2 | * | 6/2018 | Angus | B67D 1/1227 |
| 9,999,229 B2 | * | 6/2018 | Malenke | A21C 9/08 |
| 2005/0095158 A1 | * | 5/2005 | Kirschner | A47J 31/3642 417/313 |
| 2007/0090125 A1 | * | 4/2007 | Njaastad | A47F 1/085 221/309 |
| 2013/0226338 A1 | * | 8/2013 | Pickett | G07F 13/10 700/235 |
| 2014/0041748 A1 | * | 2/2014 | Angus | B67D 1/0041 141/1 |
| 2014/0251494 A1 | * | 9/2014 | Stieger | G07F 13/10 220/737 |
| 2016/0083123 A1 | * | 3/2016 | Angus | B65B 7/28 53/411 |
| 2017/0193733 A1 | * | 7/2017 | Marquis | G07F 9/026 |
| 2017/0293983 A1 | * | 10/2017 | Long, II | B67D 1/0019 |
| 2018/0222737 A1 | * | 8/2018 | Zhou | B67C 3/007 |
| 2018/0225907 A1 | * | 8/2018 | Van Den Driessche | B65G 59/108 |
| 2020/0246768 A1 | * | 8/2020 | Klein | B01F 33/35 |
| 2020/0327769 A1 | * | 10/2020 | Anziano | A23G 9/288 |
| 2020/0375388 A1 | * | 12/2020 | MacFarlane | G06Q 20/3224 |
| 2021/0225120 A1 | * | 7/2021 | Levine | G07F 13/04 |
| 2022/0267135 A1 | * | 8/2022 | Degnan | B67D 1/0035 |
| 2023/0141811 A1 | * | 5/2023 | Dresser | B67D 1/0892 141/174 |
| 2023/0177909 A1 | * | 6/2023 | Sirbu Villa | G07F 13/10 221/194 |
| 2023/0292936 A1 | * | 9/2023 | Gluszyk | G07F 11/04 221/208 |
| 2024/0025674 A1 | * | 1/2024 | Müller | B65B 7/2807 |
| 2024/0032724 A1 | * | 2/2024 | Nakao | G07F 13/10 |
| 2024/0041186 A1 | * | 2/2024 | Brandon | B01F 27/88 |
| 2024/0270427 A1 | * | 8/2024 | Thomas | B65B 43/50 |
| 2024/0278947 A1 | * | 8/2024 | Lee | B65B 7/161 |
| 2024/0304054 A1 | * | 9/2024 | Tan | G06V 20/52 |
| 2024/0308709 A1 | * | 9/2024 | Leech | B65B 25/001 |

FOREIGN PATENT DOCUMENTS

| | | | | |
|---|---|---|---|---|
| CN | 209337040 U | * | 9/2019 | B65B 7/28 |
| CN | 209947005 U | * | 1/2020 | G07F 13/10 |
| CN | 111605759 A | * | 9/2020 | B65B 7/2842 |
| CN | 112330883 A | * | 2/2021 | G07F 13/10 |
| CN | 116424616 A | * | 7/2023 | F42B 4/30 |
| DE | 202009012803 U1 | * | 12/2009 | G07F 11/14 |
| JP | 3778098 B2 | * | 5/2006 | B65B 57/00 |
| JP | 3979299 B2 | * | 9/2007 | B65B 7/28 |
| WO | WO-2022075959 A1 | * | 4/2022 | A47J 31/44 |
| WO | WO-2024212276 A1 | * | 10/2024 | B65B 7/28 |
| WO | WO-2024248752 A1 | * | 12/2024 | G07F 13/065 |

* cited by examiner

AUTOMATIC CUP COVERING SYSTEM FOR INTELLIGENT DRINKING BAR

TECHNICAL FIELD

The present invention relates to the technical field of automatic cup covering, and more specifically, to an automatic cup covering system for an intelligent drinking bar.

BACKGROUND

For self-service drink machines, there may be a certain degree of cross-infection risk as users operate them by themselves. For example, a self-service drink machine without a lid covering device may leave a cup exposed to the outside environment and susceptible to contamination by dust, insects, or other debris.

In terms of convenience, the drink machine that lacks the lid covering device require users to cover a cup with a lid manually, which increases operating steps and time consumption, and may cause congestion and inconvenience, especially in busy self-service environments. Secondly, for the protection of drinks, the lack of the lid covering device makes the drinks susceptible to external factors, such as dust, insects, debris, etc. that may enter the inside of the cup, thereby affecting the hygiene and taste of the drinks. Finally, in the absence of the lid covering device, the cup lids are easily taken carelessly or accidentally dropped, causing waste and loss of cup lids, and someone may maliciously contaminate or touch unused cup lids, increasing the cross-infection risk. To sum up, the drink machine that lacks the lid covering device may affect the convenient experience of users, reduce the protective performance of drinks, and have the potential problem of cup lids being stolen and contaminated.

To this end, the present application proposes an automatic cup covering system for an intelligent drinking bar to solve the above existing problems.

SUMMARY

In order to solve the above problems, the present application provides an automatic cup covering system for an intelligent drinking bar.

The automatic cup covering system for the intelligent drinking bar provided by the present application adopts the following technical solution:

An automatic cup covering system for an intelligent drinking bar, comprising a base, a lifting device and a cup covering device, wherein the base is provided with a cup holder opening, a cup is placed in the cup holder opening, and an end of the base away from the cup holder opening is provided with a support; the lifting device is provided on the support and located directly above the cup holder opening, and the cup covering device is configured to perform a process of covering a cup rim of the cup; and the lifting device is movably provided with a lifting connector, and the cup covering device is connected to the lifting connector.

Through the above technical solution, after receiving a drink, the cup is placed into the specified cup holder opening, and the lifting device controls the cup covering device to hold a cup lid and cover it on the cup rim from top to bottom, thereby improving the practical applicability and user experience of the drink machine. It can also reduce the risk of contamination to a certain extent and provide users with a more hygienic drinking experience.

Further, a cup holder ring with an inverted trapezoidal cross-section is detachably provided in the cup holder opening, and the cup holder ring fits an outer surface of a bottom of the cup; and a pressure sensor is further provided directly below the cup holder ring, and the pressure sensor is electrically connected to the lifting device and the cup covering device.

Through the above technical solution, the provision of the cup holder ring not only allows the cup to accurately fall into a specified position, but also allows the use of cups of different sizes by changing the size of the cup holder ring. The provision of the pressure sensor allows sending an electronic control signal to the lifting device after sensing that the cup has fallen into the cup holder opening, so that the lifting device controls the cup covering device to cover the rim of the cup that has been placed.

Further, position sensors are arranged on the support and are electrically connected to the lifting device, the number of the position sensors is three, which are an upper sensor, a middle sensor and a lower sensor, respectively, the lifting connector is located within sensing ranges of the position sensors, and the position sensors are electrically connected to the lifting device and the cup covering device.

Through the above technical solution, the upper sensor can be used to sense whether the lifting device has been raised to a specified height to facilitate a user to pick up and place the cup, and the stroke between the middle sensor and the lower sensor is used to sense whether the cup covering device is pressed down enough to cover the cup tightly when the cup is covered from top to bottom. In addition, it can also avoid safety accidents caused by exceeding the maximum stroke and crushing the cup.

Further, the lifting device comprises a lifting motor, a screw, and a slide rail, and the lifting connector comprises a sliding block and a threaded block; a driving shaft of the lifting motor is connected to the screw and is provided on a top of the support perpendicular to the cup holder; the slide rail is provided on a side surface of the support; and the sliding block is slidably provided on the slide rail, the sliding block is connected to the threaded block, and the threaded block is threadedly connected to the screw.

Through the above technical solution, such a lifting device structure can save lateral space and has high transmission efficiency. When the output shaft of the motor drives the screw to rotate, the threaded block threadedly connected to the screw moves up and down at a uniform speed, and the sliding block connected to the threaded block and sliding on the slide rail also moves up and down together.

Further, the cup covering device comprises a clamping plate. The clamping plate has an upper dragging piece and a lower pressing piece. The upper dragging piece and the lower pressing piece each have a sliding column. An upper driving plate and a lower driving plate are rotatable and are respectively above and below the clamping plate. The upper driving plate and the lower driving plate each have a sliding slot that is inclined horizontally (i.e., with varying distance to the center of rotation), the sliding slot is arcuate in shape, and the sliding column may slide in the sliding slot. Rotation of the upper driving plate and the lower driving plate respectively causes the upper dragging piece and the lower pressing piece 18 to move radially inward.

Through the above technical solution, firstly, the upper dragging piece is adjusted to be in an inwardly contracted state, and the lower pressing piece is adjusted to be in an outwardly expanded state. Then, cup lids are placed on the upper dragging piece in a stacked manner, and there may be a gap between adjacent cup lids (traditional cup lids each have an outer edge that is larger than its own lid body, and the bottom of the outer edge is usually inwardly concave. Such cup lids are common and mature products on the market, and will not be described again here).

When the cup needs to be covered, the cup covering device moves downward until the lower pressing piece is close to the cup rim, and then the right motor drives the gear to drive the lower driving plate to rotate. During the rotation of the lower driving plate, the position of the sliding column located in the sliding slot changes, thereby making the lower pressing piece spread outward. Next, the cup covering device is further controlled to continue to move downward until the penetration of the lower pressing piece maintains a certain distance from the cup rim. The distance is the height of the outer edge of the cup lid. This is done so that the lower pressing piece can press down on the outer edge.

The left motor is controlled to drive the gear to drive the upper driving plate to rotate. During the rotation of the lower driving plate, the position of the sliding column located in the sliding slot changes, thereby causing the upper dragging piece to spread outward, and causing the last cup lid to fall on the cup rim.

Then, the right motor is controlled to reset so that the lower pressing piece contracts inward but does not block the cup lid, and the lower pressing piece is located at the upper end of the outer edge of the cup lid. Next, the cup covering device is controlled to continue going downward so that the pressing piece exerts downward pressure on the outer edge of the cup lid. During this process, the upper dragging piece is located within the gap between adjacent cup lids. After the last cup lid falls, the upper dragging piece will drag the penultimate cup lid to prevent it from continuing to fall.

When the last cup lid is fully snapped on the cup rim, the lower sensor also senses that the cup covering device has reached its maximum stroke, the pressure sensor also senses that it has reached the maximum pressure, and then, the cup covering device is controlled to reset. During the reset process, the lower pressing piece is also reset to prevent the cup lid from falling off, and the upper dragging piece spreads outward to cause the cup lid to fall due to gravity, waiting for the next round of cup covering.

During the process of spread or contraction of the upper dragging piece and the lower pressing piece, they are controlled by the arc-shaped sliding slot. When the upper driving plate and the lower driving plate rotate, the sliding column in the arc-shaped sliding slot inclined horizontally drives the clamping block to move. For example, when the sliding block is located in the sliding slot away from the center point of rotation, the sliding block spreads outward. When the sliding block is located in the sliding slot close to the center point of rotation, the sliding block is in a contracted state.

The distance between the upper dragging piece and the lower pressing piece, the stroke of the two, etc. can be adjusted and modified according to the shape of the cup lid actually used.

Further, an upper fixed plate is provided on the upper driving plate, a lower fixed plate is provided below the lower driving plate, and the lower fixed plate is connected to the lifting connector; the upper fixed plate, the upper driving plate, the clamping plate, the lower driving plate, and the lower fixed plate all have the same circle center and are all provided with through holes with the same size; and the upper fixed plate, the clamping plate and the lower fixed plate are connected, and the upper driving plate and the lower driving plate are both rotatably provided.

Further, a left motor and a right motor are symmetrically and provided on the upper fixed plate, and bottoms of the left motor and the right motor are each provided with a gear; and outer edges of the upper driving plate and the lower driving plate are each provided with teeth arranged in a fan shape, and the gear meshes with the teeth.

Through the above technical solution, the left motor and the right motor are used to drive the upper driving plate and the lower driving plate to rotate, respectively, thereby controlling upper clamping and the movement of the lower pressing piece.

Further, a magnetic block is provided at the end of each tooth, the upper fixed plate and the lower fixed plate are each provided with magnetic sensor groups, the number of the magnetic sensor groups is at least two, and a rotation range of the teeth is located within a monitoring range of the magnetic sensor groups; and the magnetic sensor groups are electrically connected to the left motor, the right motor and the lifting device.

Through the above technical solution, the magnetic sensor group can sense whether the upper driving plate and the lower driving plate are reset or not and avoid rotating beyond the stroke, causing the cup lid to fall off or crush the cup lid. When they are rotated to the maximum stroke, it can be ensured that the cup lid falls smoothly. When they are rotated to a preset stroke, the cup lid can be clamped without damaging the cup lid.

Further, a cup lid cylinder is provided on the upper fixed plate, cup lids is placed in the cup lid cylinder, and an inner diameter of the cup lid cylinder is the same as an inner diameter of the through hole.

Through the above technical solution, the provision of the cup lid cylinder allows to place more cup lids at one time, reducing the cost of later maintenance. Cup lid cylinders of different sizes can also be replaced according to actual situations.

In summary, the present application comprises at least one of the following beneficial technical effects:

(1) After receiving a drink, the cup is placed into the specified cup holder opening, and the lifting device controls the cup covering device to hold a cup lid and cover it on the cup rim from top to bottom, thereby improving the practical applicability and user experience of the drink machine. It can also reduce the risk of contamination to a certain extent and provide users with a more hygienic drinking experience.

Figure 1:
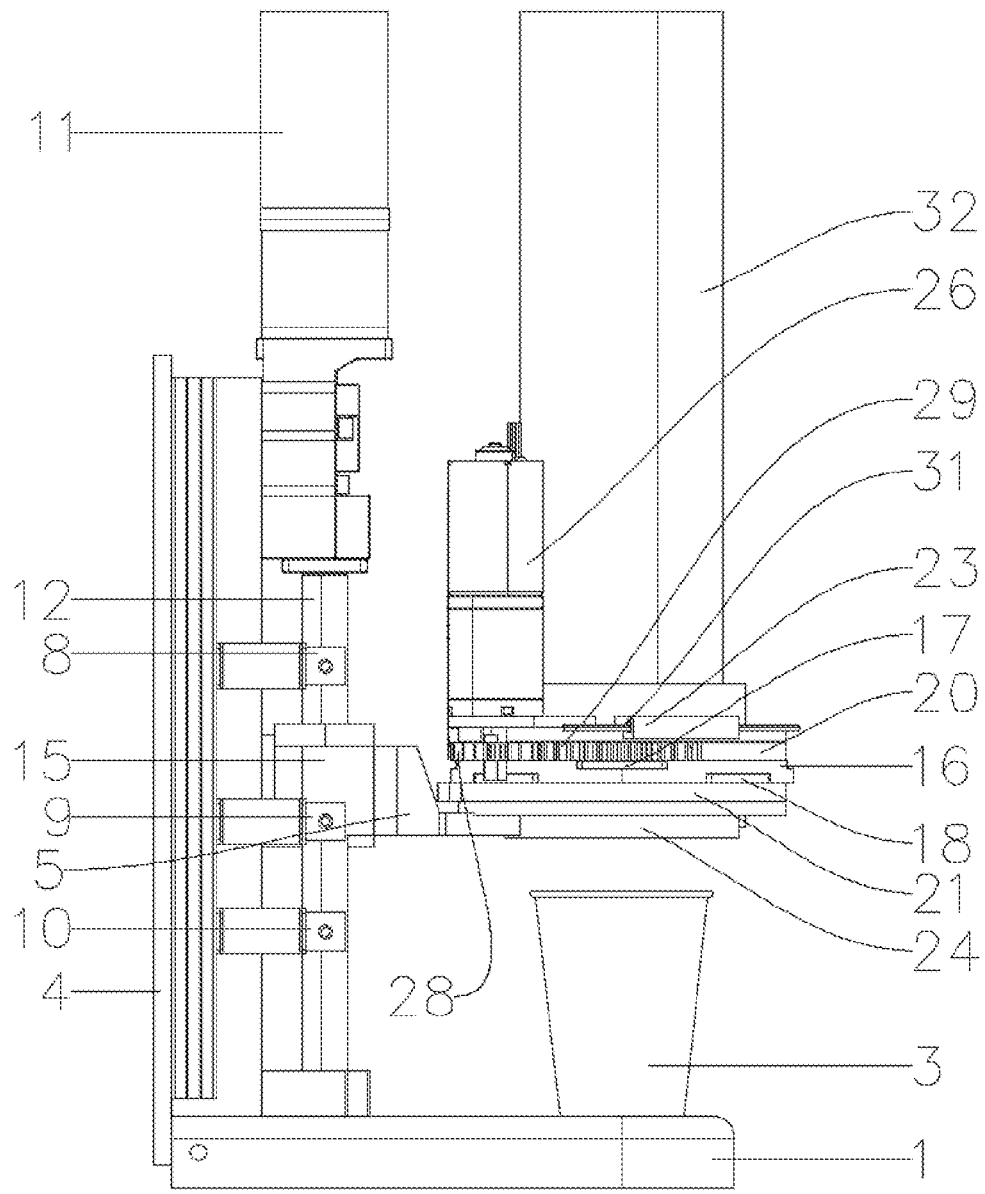
FIG. 1 is a schematic structural view of the present application.

Description of reference signs in the figures: 1. base; 2. cup holder opening; 3. cup; 4. support; 5. lifting connector; 6. cup holder ring; 7. pressure sensor; 8. upper sensor; 9. middle sensor; 10. lower sensor; 11. lifting motor; 12. screw; 13. slide rail; 14. sliding block; 15. threaded block; 16. clamping plate; 17. upper dragging piece; 18. lower pressing piece; 19. sliding column; 20. upper driving plate; 21. lower driving plate; 22. sliding slot; 23. upper fixed plate; 24. lower fixed plate; 25. through hole; 26. left motor; 27. right motor; 28. gear; 29. tooth; 30. magnetic block; 31. magnetic sensor group; 32. cup lid cylinder; and 33. cup lid.

DETAILED DESCRIPTION

The technical solutions in the embodiments of the present application will be clearly and completely described below with reference to the drawings in the embodiments of the present application. Obviously, the described embodiments are only a part of the embodiments of the present application, and not all the embodiments. All other embodiments obtained by those of ordinary skill in the art on the basis of the embodiments of the present application without creative efforts are all within the scope of the present application.

In the description of the present application, it should be noted that the orientations or positional relationships indicated by the terms such as "upper", "lower", "inner", "outer", and "top/bottom end" are based on the orientations or positional relationships shown in the drawings, which is only for the purpose of facilitating the description of the present application and simplifying the description, rather than indicating or implying that the device or element referred to must have a specific orientation, and construct and operate in a specific orientation. Therefore, these cannot be understood as a limitation of the present application. In addition, the terms "first" and "second" are only used for descriptive purposes, and cannot be understood as the indication or implication of relative importance.

In the description of the present application, it should be noted that unless otherwise clearly specified and limited, the terms such as "mounted", "provided with", "sleeved/sheathed" and "connected" should be understood in a broad sense. For example, "connected" may be a fixed connection, or may be a detachable connection, or may be an integral connection; it may be a mechanical connection, or may be an electrical connection; and it may be directly connected, or may be indirectly connected through an intermediate medium, or may be an internal communication of two elements. For those of ordinary skill in the art, the specific meanings of the aforementioned terms in the present application can be understood according to specific situations.

EMBODIMENTS

The present application will be further described in detail below with reference to FIGS. 1-6.

An automatic cup covering system for an intelligent drinking bar is disclosed in an embodiment of the present application. The automatic cup covering system comprises a base 1, a lifting device and a cup covering device. The base 1 is provided with a cup holder opening 2, and a cup 3 is placed in the cup holder opening 2. An end of the base 1 away from the cup holder opening 2 is provided with a support 4. The lifting device is provided on the support 4 and located directly above the cup holder opening 2, and the cup covering device is configured to perform a process of covering a cup rim of the cup 3. The lifting device is movably provided with a lifting connector 5, and the cup covering device is connected to the lifting connector 5. After receiving a drink, the cup 3 is placed into the specified cup holder opening 2, and the lifting device controls the cup covering device to hold a cup lid 33 and cover it on the cup rim from top to bottom, thereby improving the practical applicability and user experience of the drink machine. It can also reduce the risk of contamination to a certain extent and provide users with a more hygienic drinking experience.

Figure 2:
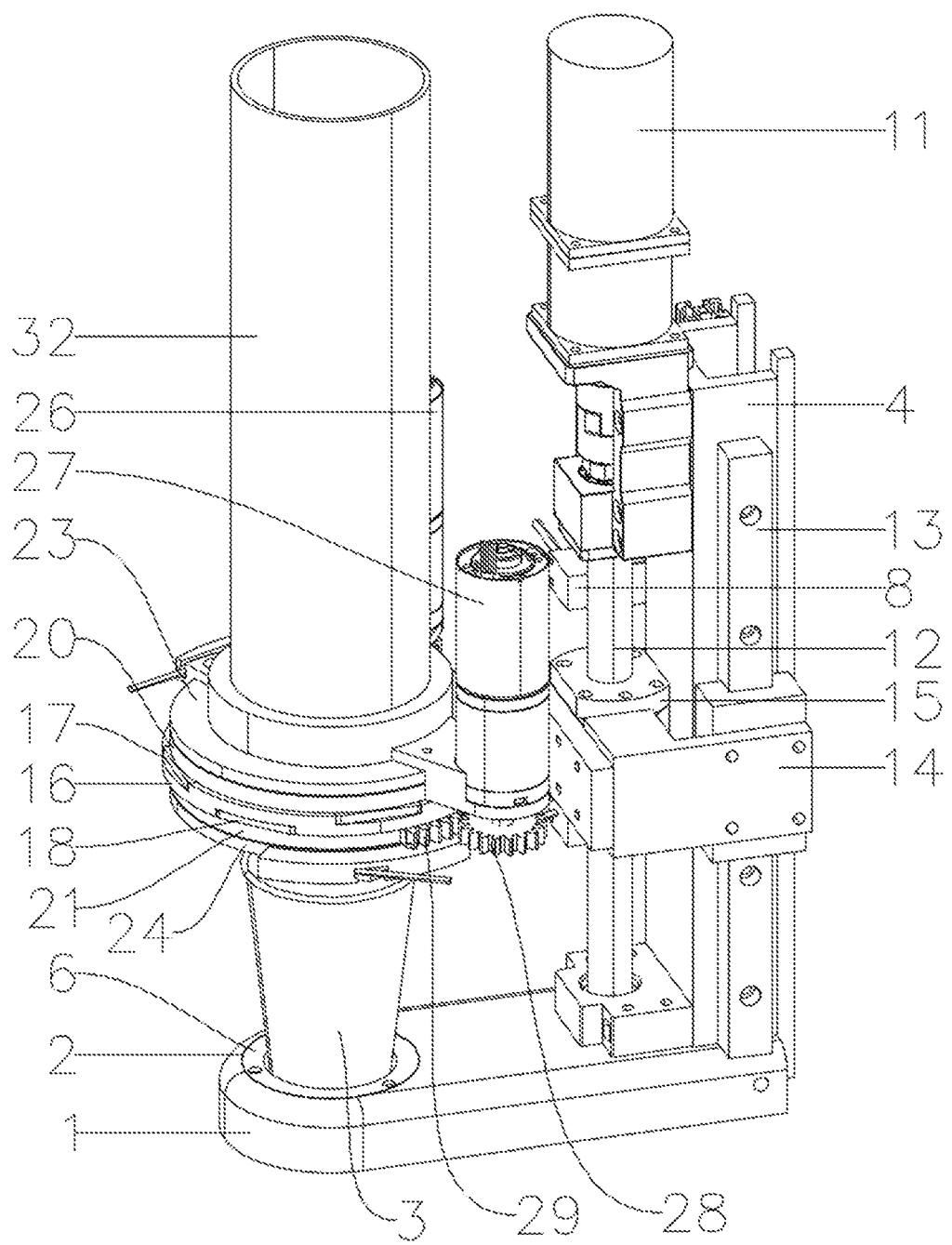
FIG. 2 is a perspective view of the present application.
Figure 3:
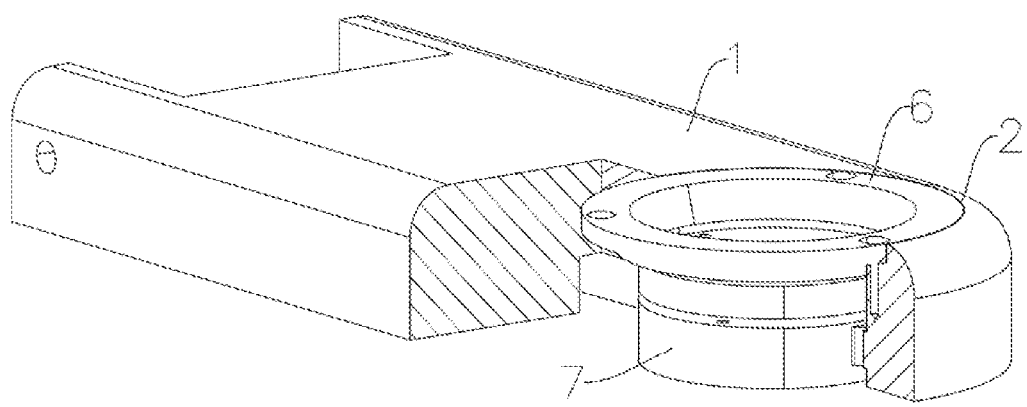
FIG. 3 is a schematic structural view of a base.

With reference to FIGS. 2 and 3, a cup holder ring 6 with an inverted trapezoidal cross-section is detachably provided in the cup holder opening 2, and cup holder ring 6 fits an outer surface of a bottom of the cup 3. A pressure sensor 7 is further provided directly below the cup holder ring 6, and the pressure sensor 7 is electrically connected to the lifting device and the cup covering device. The provision of the cup holder ring 6 not only allows the cup 3 to accurately fall into a specified position, but also allows the use of cups 3 of different sizes by changing the size of the cup holder ring 6. The provision of the pressure sensor 7 allows sending an electronic control signal to the lifting device 2 after sensing that the cup 3 has fallen into the cup holder opening 2, so that the lifting device controls the cup covering device to cover the rim of the cup 3 that has been placed.

With reference to FIG. 1, position sensors are provided on the support 4 and are electrically connected to the lifting device. The number of the position sensors is three, which are an upper sensor 8, a middle sensor 9 and a lower sensor 10, respectively. The lifting connector 5 is located within sensing ranges of the position sensors, and the position sensors are electrically connected to the lifting and the cup covering device. The upper sensor 8 can be used to sense whether the lifting device has been raised to a specified height to facilitate a user to pick up and place the cup 3, and the stroke between the middle sensor 9 and the lower sensor 10 is used to sense whether the cup covering device is pressed down enough to cover the cup tightly when the cup 3 is covered from top to bottom. In addition, it can also avoid safety accidents caused by exceeding the maximum stroke and crushing the cup 3.

With reference to FIGS. 1 and 2, the lifting device comprises a lifting motor 11, a screw 12, and a slide rail 13, and the lifting connector 5 comprises a sliding block 14 and a threaded block 15. A driving shaft of the lifting motor 11 is connected to the screw 12 and is provided on the top of the support 4 perpendicular to the cup holder. The slide rail 13 is provided on a side surface of the support 4. The sliding block 14 is slidably provided on the slide rail 13, the sliding block 14 is connected to the threaded block 15, and the threaded block 15 is threadedly connected to the screw 12. Such a lifting device structure can save lateral space and has high transmission efficiency. When the output shaft of the motor drives the screw 12 to rotate, the threaded block 15 threadedly connected to the screw 12 moves up and down at a uniform speed, and the sliding block 14 connected to the threaded block 15 and sliding on the slide rail 13 also moves up and down together.

With reference to FIGS. 1, 2, 4, 5 and 6, the cup covering device comprises a clamping plate 16. The clamping plate 16 has an upper dragging piece 17 and a lower pressing piece 18. The upper dragging piece 17 and the lower pressing piece 18 each have a sliding column 19. An upper driving plate 20 and a lower driving plate 21 are rotatable and are respectively above and below the clamping plate 16. The upper driving plate 20 and the lower driving plate 21 each have a sliding slot 22 that is inclined horizontally (i.e., with varying distance to the center of rotation), the sliding slot 22 is arcuate in shape, and the sliding column 19 can slide in the sliding slot 22. Rotation of the upper driving plate 20 and the lower driving plate 21 respectively causes the upper dragging piece 17 and the lower pressing piece 18 to move radially inward.

Firstly, the upper dragging piece 17 is adjusted to be in an inwardly contracted state, and the lower pressing piece is adjusted to be in an outwardly expanded state. Then, cup lids 33 are placed on the upper dragging piece 17 in a stacked manner, and there may be a gap between adjacent cup lids 33 (traditional cup lids e33 ach have an outer edge that is larger than its own lid body, and the bottom of the outer edge is usually inwardly concave. Such cup lids 33 are common and mature products on the market, and will not be described again here).

When the cup needs to be covered, the cup covering device moves downward until the lower pressing piece 18 is close to the cup rim, and then the right motor 27 drives the gear 28 to drive the lower driving plate 21 to rotate. During the rotation of the lower driving plate 21, the position of the sliding column 19 located in the sliding slot 22 changes, thereby making the lower pressing piece 18 spread outward. Next, the cup covering device is further controlled to continue to move downward until the penetration of the lower pressing piece 18 maintains a certain distance from the cup rim. The distance is the height of the outer edge of the cup lid 33. This is done so that the lower pressing piece 18 can press down on the outer edge.

The left motor 26 is controlled to drive the gear 28 to drive the upper driving plate 20 to rotate. During the rotation of the lower driving plate 21, the position of the sliding column 19 located in the sliding slot 22 changes, which thus causes the upper dragging piece 17 to spread outward, causing the last cup lid 33 to fall on the cup rim.

Then, the right motor 27 is controlled to reset so that the lower pressing piece 18 contracts inward but does not block the cup lid 33, and the lower pressing piece 18 is located at the upper end of the outer edge of the cup lid 33. Next, the cup covering device is controlled to continue going downward so that the pressing piece exerts downward pressure on the outer edge of the cup lid 33. During this process, the upper dragging piece 17 is located within the gap between adjacent cup lids 33. After the last cup lid 33 falls, the upper dragging piece 17 will drag the penultimate cup lid 33 to prevent it from continuing to fall.

When the last cup lid 33 is fully snapped on the cup rim, the lower sensor 10 also senses that the cup covering device has reached its maximum stroke, the pressure sensor 7 also senses that it has reached the maximum pressure, and then, the cup covering device is controlled to reset. During the reset process, the lower pressing piece 18 is also reset to prevent the cup lid 33 from falling off, and the upper dragging piece 17 spreads outward to cause the cup lid 33 to fall due to gravity, waiting for the next round of cup covering.

During the process of spread or contraction of the upper dragging piece 17 and the lower pressing piece 18, they are controlled by the arc-shaped sliding slot 22. When the upper driving plate 20 and the lower driving plate 21 rotate, the sliding column 19 in the arc-shaped sliding slot 22 inclined horizontally drives the clamping block to move. For example, when the sliding block 14 is located in the sliding slot 22 away from the center point of rotation, the sliding block 14 spreads outward. When the sliding block 14 is located in the sliding slot 22 close to the center point of rotation, the sliding block 14 is in a contracted state.

The distance between the upper dragging piece 17 and the lower pressing piece 18, the stroke of the two, etc. can be adjusted and modified according to the shape of the cup lid 33 actually used.

During the process of spread or contraction of the upper dragging piece 17 and the lower pressing piece 18, they are controlled by the arc-shaped sliding slot 22. When the upper driving plate 20 and the lower driving plate 21 rotate, the sliding column 19 in the arc-shaped sliding slot 22 inclined horizontally drives the clamping block to move. For example, when the sliding block 14 is located in the sliding slot 22 away from the center point of rotation, the sliding block 14 spreads outward. When the sliding block 14 is located in the sliding slot 22 close to the center point of rotation, the sliding block 14 is in a contracted state.

With reference to FIGS. 1, 2, 3 and 6, an upper fixed plate 23 is provided on the upper driving plate 20, a lower fixed plate 24 is provided below the lower driving plate 21, and the lower fixed plate 24 is connected to the lifting connector 5. The upper fixed plate 23, the upper driving plate 20, the clamping plate 16, the lower driving plate 21, and the lower fixed plate 24 all have the same circle center and are all provided with through holes 25 with the same size. The upper fixed plate 23, the clamping plate 16 and the lower fixed plate 24 are connected, and the upper driving plate 20 and the lower driving plate 21 are both rotatably provided.

With reference to FIGS. 1, 2, 3 and 6, a left motor 26 and a right motor 27 are symmetrically and provided on the upper fixed plate (6), and the bottoms of the left motor 26 and the right motor 27 are each provided with a gear 28. Outer edges of the upper driving plate 20 and the lower driving plate 21 are each provided with teeth 29 arranged in a fan shape, and the gear 28 meshes with the teeth 29. The left motor 26 and the right motor 27 are used to drive the upper driving plate 20 and the lower driving plate 21 to rotate, respectively, thereby controlling upper clamping and the movement of the lower pressing piece 18.

Figure 4:
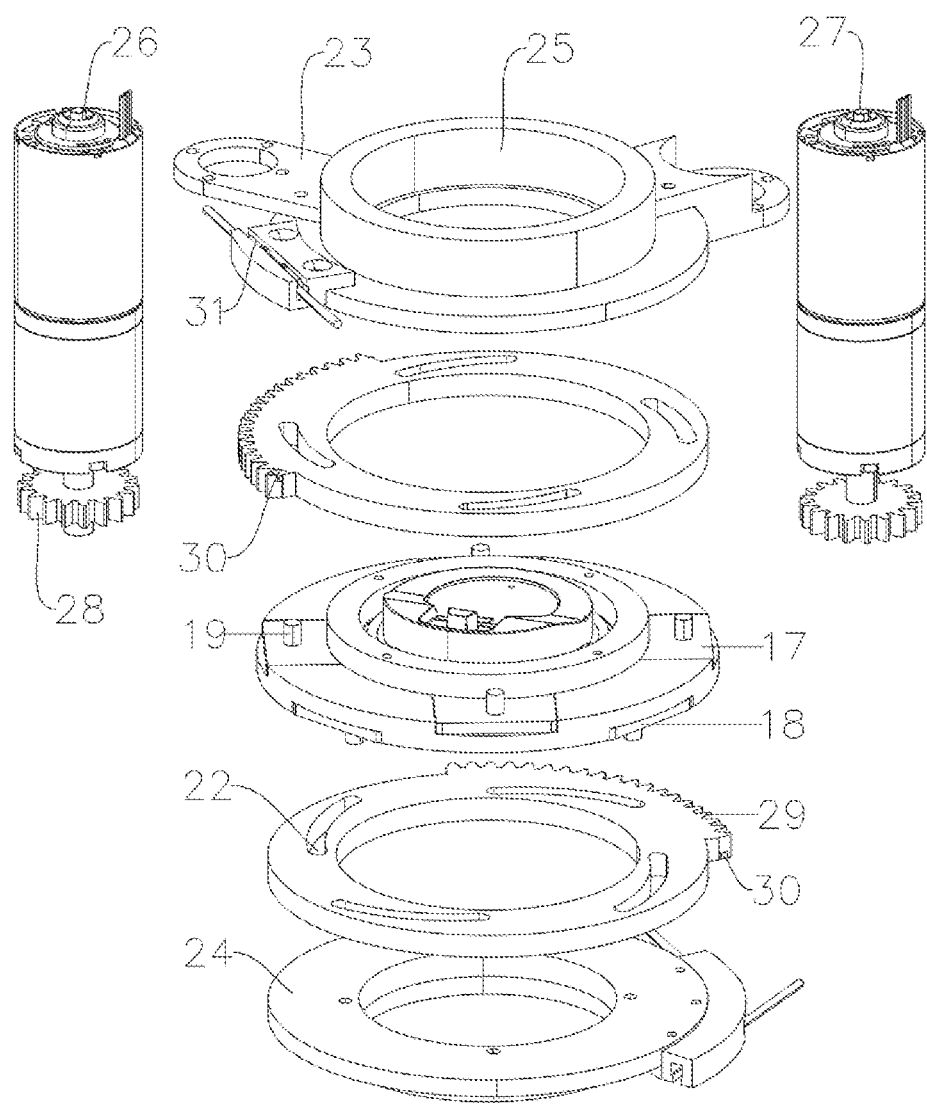
FIG. 4 is an exploded view of a cup covering device.
Figure 5:
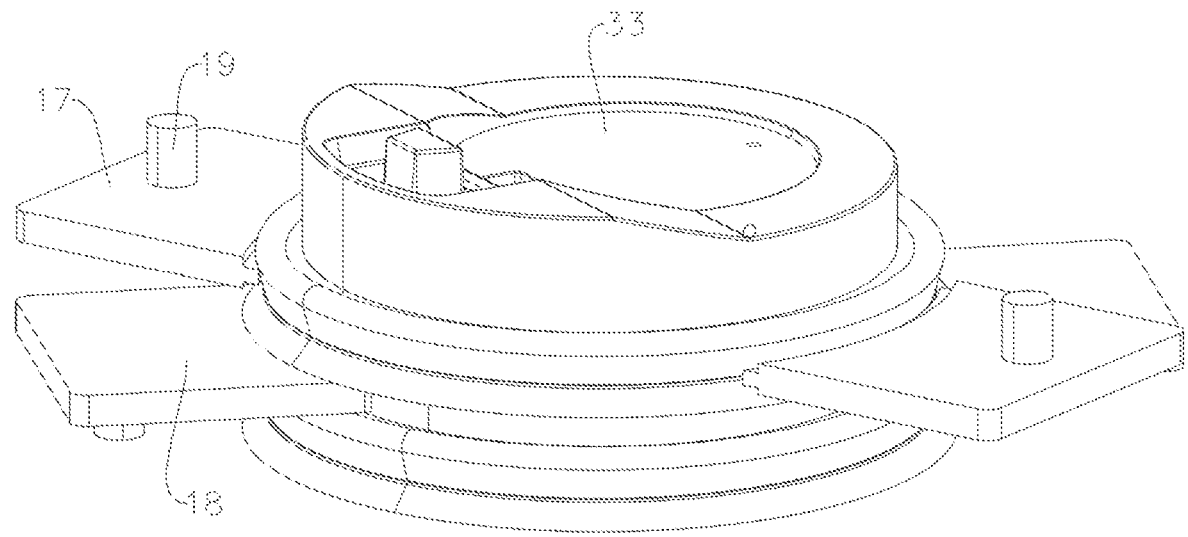
FIG. 5 is a schematic structural view of a cup lid.
Figure 6:
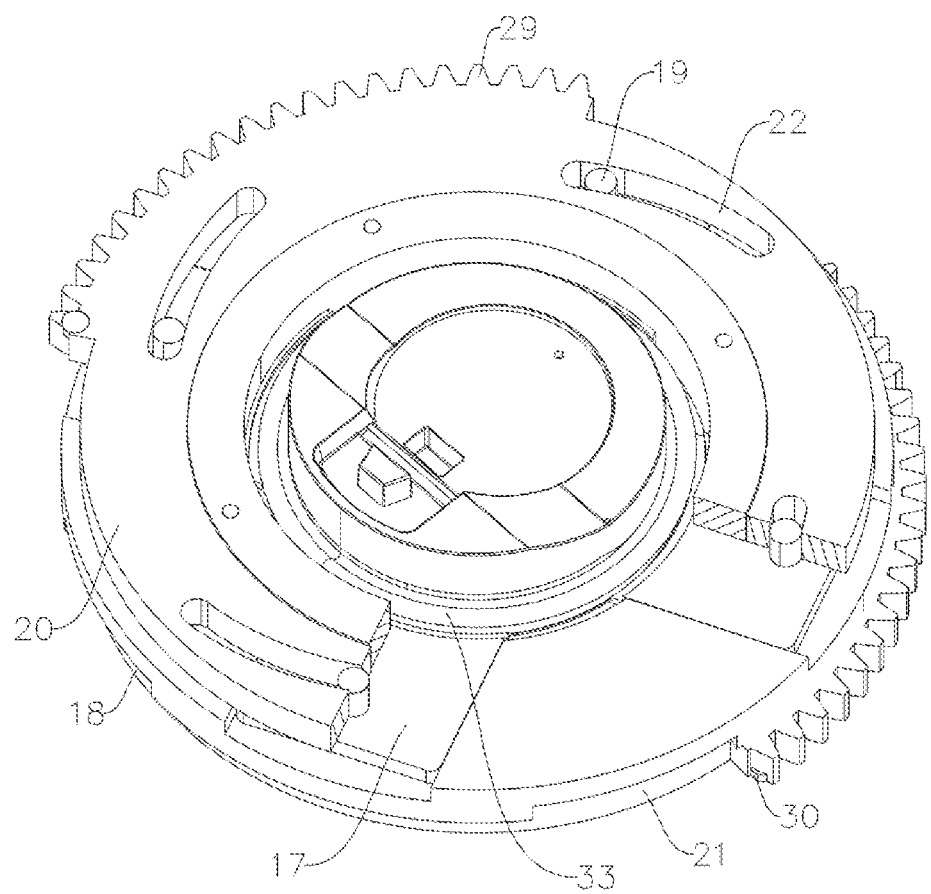
FIG. 6 is a schematic structural view of an upper driving plate.

With reference to FIGS. 4 and 6, a magnetic block 30 is provided at the end of each tooth 29, the upper fixed plate 23 and the lower fixed plate 24 are each provided with magnetic sensor groups 31, the number of the magnetic sensor groups 31 is at least two, and a rotation range of the teeth 29 is located within a monitoring range of the magnetic sensor groups 31. The magnetic sensor groups 31 are electrically connected to the left motor 26, the right motor 27 and the lifting device. The magnetic sensor group 31 can sense whether the upper driving plate 20 and the lower driving plate 21 are reset or not and avoid rotating beyond the stroke, causing the cup lid 33 to fall off or crush the cup lid 33. When they are rotated to the maximum stroke, it can be ensured that the cup lid 33 falls smoothly. When they are rotated to a preset stroke, the cup lid 33 can be clamped without damaging the cup lid 33.

With reference to FIGS. 1 and 2, a cup lid cylinder 32 is provided on the upper fixed plate 23, cup lids 33 is placed in cup lid cylinder 32, and an inner diameter of cup lid cylinder 32 is the same as an inner diameter of the through hole 25. The provision of the cup lid cylinder 32 allows placing more cup lids 33 at one time, reducing the cost of later maintenance. Cup lid cylinders 32 of different sizes can also be replaced according to actual situations.

The implementation principle of the automatic cup covering system for the intelligent drinking bar in the embodiment of the present application is as follows:

Before use, the cup covering device is at its maximum upward stroke, and it is ensured that the upper dragging piece 17 is in an inwardly contracted state, and then the cup lids 33 are placed into the cup lid cylinder 32.

When in use, the cup 3 is placed in the cup holder opening 2. The pressure sensor 7 at the bottom of the cup holder opening 2 senses the presence of the cup 3, and then sends an electrical control instruction to the lifting motor 11 so that it drives the screw 12 to rotate, thereby controlling the lifting connector 5 to drive the cup covering device to move downward.

The middle sensor 9 detects that the cup covering device moves to a specified position and then sends an electrical control instruction to the lifting motor 11 to stop the movement. Then, the upper left motor 26 rotates the gear 28 to drive the upper driving plate 20 to rotate, and the sliding slot on the upper driving plate 20 22 drives the displacement of the sliding column 19 so as to control the displacement of the upper dragging piece 17. After the upper dragging piece 17 spreads outward, the cup lid 33 falls downward to the cup rim due to gravity. At this time, the right motor 27 controls the lower pressing piece 18 to contract inward, and the lower pressing piece 18 is located at the upper end of the outer edge of the cup lid 33. When the magnetic sensor senses that the lower driving plate 21 rotates to the specified position, it sends an instruction to the lifting motor 11 to continue to control the cup covering device to move downward. During the downward movement, the lower pressing piece 18 exerts downward pressure on the outer edge of the cup lid 33 so that it covers and snaps on the cup rim.

During the process of covering with the cup lid 33, the pressure sensor 7 senses the pressure exerted by the lower pressing piece 18 in the cup covering device, and the lower sensor 10 monitors the stroke data of the downward movement of the cup covering device. When the maximum pressure and maximum stroke are reached, the lower sensor 10 and the pressure sensor 7 send instructions to the lifting motor 11 to stop pressing down and reset upward.

Finally, a complete cup 3 with a cup lid 33 is obtained.

The above are all preferred embodiments of the present application, and are not intended to limit the scope of protection of the present application. Therefore, any equivalent changes made based on the structures, shapes, and principles of the present application shall be covered by the scope of protection of the present application.

What is claimed is:

1. An automatic cup covering system, comprising a base, a lifting device and a cup covering device,
    wherein the base comprises a cup holder opening configured to receive a cup;
    wherein an end of the base away from the cup holder opening comprises a support;
    wherein the lifting device is on the support and directly above the cup holder opening;
    wherein the cup covering device is configured to cover a cup rim of the cup;
    wherein the lifting device comprises a lifting connector, and the cup covering device is connected to the lifting connector;
    wherein the cup covering device comprises a clamping plate,
    wherein the clamping plate comprises an upper dragging piece and a lower pressing piece;
    wherein the upper dragging piece and the lower pressing piece each comprises a sliding column;
    wherein the automatic cup covering system further comprises an upper driving plate and a lower driving plate that are rotatable and are respectively above and below the clamping plate;
    wherein the upper driving plate and the lower driving plate each comprise a sliding slot that is inclined horizontally and arcuate in shape;
    wherein the sliding column is slidable in the sliding slot;
    wherein rotation of the upper driving plate and the lower driving plate respectively causes the upper dragging piece and the lower pressing piece to move radially inward; and
    wherein the upper driving plate comprises an upper fixed plate, the lower driving plate comprises a lower fixed plate connected to the lifting connector; wherein the upper fixed plate, the upper driving plate, the clamping plate, the lower driving plate, and the lower fixed plate are concentric and comprise through holes; and wherein the upper fixed plate, the clamping plate and the lower fixed plate are connected, and the upper driving plate and the lower driving plate are both rotatable.

2. The automatic cup covering system according to claim 1, wherein the cup holder opening comprises a cup holder ring with an inverted trapezoidal cross-section and the cup holder ring is detachable, and the cup holder ring fits an outer surface of a bottom of the cup; and
    wherein the automatic cup covering system comprises a pressure sensor directly below the cup holder ring, and the pressure sensor is electrically connected to the lifting device and the cup covering device.

3. The automatic cup covering system according to claim 1, wherein the automatic cup covering system comprises an upper position sensor, a middle position sensor and a lower position sensor, all of which are on the support and electrically connected to the lifting device and the cup covering device;
    wherein the lifting connector is within sensing ranges of the upper position sensor, the middle position sensor and the lower position sensor.

4. The automatic cup covering system according to claim 1, wherein the lifting device comprises a lifting motor, a screw, and a slide rail;
    wherein the lifting connector comprises a sliding block and a threaded block;
    wherein a driving shaft of the lifting motor is connected to the screw and is on a top of the support perpendicular to the cup holder;
    wherein the slide rail is on a side surface of the support;
    wherein the sliding block is slidably on the slide rail;
    wherein the sliding block is connected to the threaded block; and
    wherein the threaded block is threadedly connected to the screw.

5. The automatic cup covering system according to claim 1, further comprising a left motor and a right motor on the upper fixed plate, wherein bottoms of the left motor and the right motor each comprise a gear; and wherein outer edges of the upper driving plate and the lower driving plate each comprise teeth configured to engage the gear.

6. The automatic cup covering system according to claim 5, wherein each of the teeth at an end thereof comprises a magnetic block,
    wherein the upper fixed plate and the lower fixed plate each comprise at least two magnetic sensor groups,
    wherein a rotation range of the teeth is within a monitoring range of the magnetic sensor groups, and
    wherein the magnetic sensor groups are electrically connected to the left motor, the right motor and the lifting device.

7. The automatic cup covering system according to claim 1, wherein the upper fixed plate comprises a cup lid cylinder configured to receive cup lids, and an inner diameter of the cup lid cylinder is the same as an inner diameter of the through holes.

* * * * *